United States Patent
DeAngelis et al.

(10) Patent No.: US 6,731,834 B2
(45) Date of Patent: May 4, 2004

(54) SYSTEM AND METHOD TO CALIBRATE AN OPTICAL CROSS-CONNECT

(75) Inventors: Mario Eugene DeAngelis, Somerset, NJ (US); William R. Holland, Somerset, NJ (US); Stanley Pau, Union, NJ (US)

(73) Assignees: Agere Systems, Inc., Allentown, PA (US); Lucent Technologies, Inc., Murray Hill, NJ (US)

( * ) Notice: Subject to any disclaimer, the term of this patent is extended or adjusted under 35 U.S.C. 154(b) by 147 days.

(21) Appl. No.: 10/142,075

(22) Filed: May 8, 2002

(65) Prior Publication Data

US 2003/0210850 A1 Nov. 13, 2003

(51) Int. Cl.[7] .............................. G02B 6/26; G02B 6/42; H04J 14/00
(52) U.S. Cl. .............................. 385/17; 385/16; 385/18; 398/50; 398/56
(58) Field of Search ........................ 385/14–24; 398/45, 398/50, 52, 56

(56) References Cited

U.S. PATENT DOCUMENTS

2003/0091270 A1 * 5/2003 Abbott et al. .................. 385/18
2003/0133644 A1 * 7/2003 Gates et al. .................. 385/18

OTHER PUBLICATIONS

Gates et al., U.S. patent application Ser. No. 10/046,352, "Method for Calibrating a MEMS Device", filed Jan. 4, 2001.

C. Nuzman, S. Pau, and A. Weiss, "Training the Lambda Router: algorithms and experience," Bell Labs TM 10009626–001214–37.

D. Bishop, P. Gammel, C. R. Giles, "The Little Machines that are Making it Big," Physics Today, vol. 54, No. 10, p. 38, 2001.

* cited by examiner

*Primary Examiner*—Brian Healy
*Assistant Examiner*—Kevin S. Wood
(74) *Attorney, Agent, or Firm*—Naren Chaganti

(57) ABSTRACT

A time-division multiplexed optical signal is routed to several input ports of a MEMS-mirror Optical Cross connect (OXC). Advantageously, a single optical signal can be routed through fiber delay coils of varying lengths to introduce precise delay to an optical pulse such that the optical pulse is fed to the input ports of the OXC at various timeslots. After switching the optical pulses through the OXC, the switched optical pulse at different timeslots is combined (multiplexed) and thereafter detected. The amount of optical energy in the (combined) received (output) enables the calibration or training of the OXC. The circuit may be reconfigured to measure the amount of cross talk (signal leakage), insertion loss, and time delay that the OXC introduces in the system.

24 Claims, 4 Drawing Sheets

SYSTEM AND METHOD TO CALIBRATE AN OPTICAL CROSS-CONNECT

TECHNICAL FIELD

The present invention is related in general to the field of fiber optics, and in particular, to training an optical cross-connect.

BACKGROUND

As voice calls or data are routed through a telecommunications network, information travels through many fiber-optic segments, which are linked together using cross-connects. Typically, information (e.g., packets of data) is converted from light into an electronic signal, routed to the next circuit pathway, and then converted back into light as it travels to the next network destination.

An optical cross-connect (OXC) in the physical layer of an optical network is a fundamental building block used to terminate and administer communication circuits. An OXC allows the installation of new terminal equipment by interconnecting input and output ports in an optical network. In the case of a free space optical cross connect, an array of micro electro-mechanical (MEMS) tilting mirror devices acts as the switching fabric. By adjusting the tilt angles of the MEMS mirror devices, optical signals can be directed to various destinations, i.e., to various output fibers.

The calibration, or "training," of the several mirror-pairs, or switches, in a MEMS-mirror OXC system is a critical process in its manufacture. Because the number of switch connections for these systems scales quadratically to the number of inputs/outputs (I/O) this places great demands on the equipment used to perform training.

Prior art training equipment technology has relied heavily upon the use of numerous and costly Original Equipment Manufacturers' (OEM) optical switch boxes and also on as many optical sources and detectors as there are I/Os. This state of the art can be improved.

SUMMARY

This disclosure includes an opto-electronic or a fully optical circuit in which time-division-multiplexed optical signal is routed to several input ports of a MEMS-mirror Optical Cross connect (OXC). Advantageously, a single optical signal can be routed through fiber delay coils of varying lengths to introduce precise delay to an optical pulse such that the optical pulse is fed to input ports of the OXC at various timeslots. After switching the optical pulses through the OXC, the switched optical pulse at different timeslots is combined (multiplexed). The amount of optical energy in the (combined) received (output) enables the calibration or training of the OXC. The disclosed circuit may be reconfigured to measure the amount of cross talk that the OXC introduces in the system.

A single laser source is used to create a short optical pulse that is then replicated, or split, into as many pulses as there are input ports into an OXC system, for example, N pulses for N input ports. A sufficient number of delay coils producing the appropriate time delays is then used and arranged so as to ensure that each OXC input port receives a unique time-slotted pulse. Additional delay coils can be used on the output side of the OXC to ensure that irrespective of which switch path the pulses take through the OXC, the pulses will maintain a unique time-slot for that path. The N output fibers can then be directed to a single detector for detection of the pulses over a period of time specified by the total number of time-slots. Thus, for each pulse developed at the input to the training system there will be N uniquely time-slotted pulses at the output. The particular time slots that these N pulses reside in at the output will depend on the N switch connections that were made. For this one-time-slot-per-switch-connection scheme up to $N^2$ time-slots are necessary therefore to cover all of the $N^2$ possible switch connections that can be made.

BRIEF DESCRIPTION OF THE DRAWINGS

These and other features, objects and advantages of the present invention are more readily understood from the following detailed description with reference to the accompanying drawings, where like numbers designate like parts throughout the several views, and wherein.

DETAILED DESCRIPTION

Figures 1, 1A:
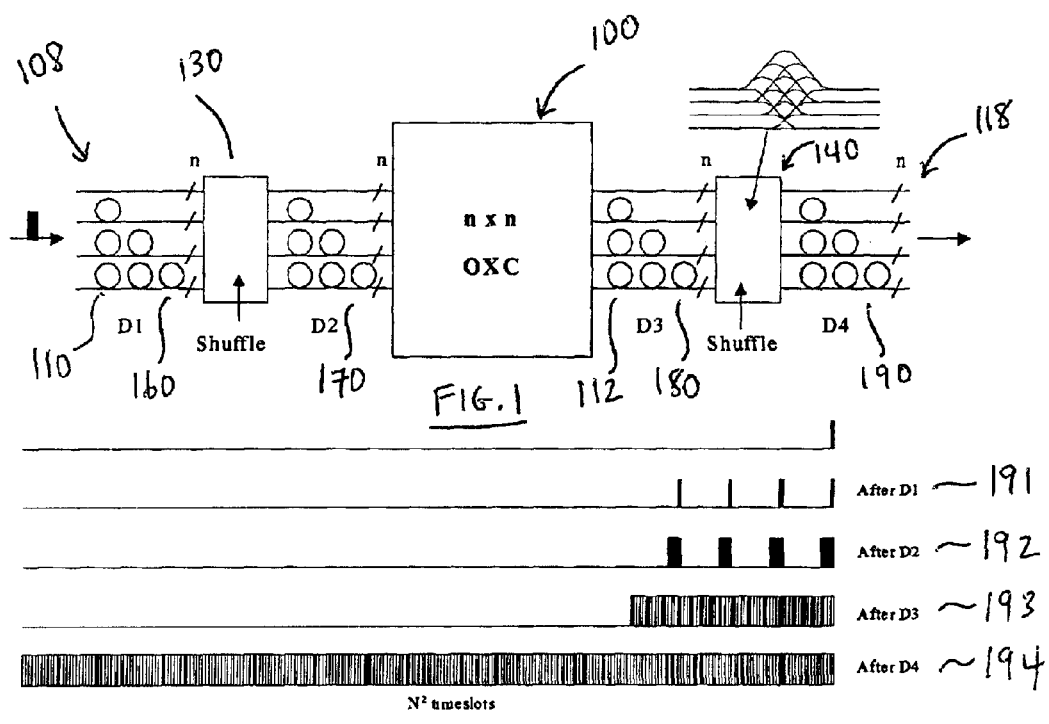
FIG. 1 shows an illustrative embodiment of time-multiplexed OXC training system technology, wherein FIG. 1A demonstrates pulse replication and time slotting at various stages in the system of FIG. 1.

The following detailed description of the principles of the novel aspects of the present disclosure uses an illustration of a 40×40 and further a 256×256 micro electromechanical mirror (MEMS-mirror) optical cross connect (OXC). These illustrative embodiments are used to describe the principles invented; they should not be treated as limitations of the inventive principles.

As stated above, the process of determining the electrostatic voltages for aligning I/O mirror-pairs with their respective I/O fiber lines is called training or calibrating a MEMS-mirror OXC system. Some such methods and systems are described in C. Nuzman, S. Pau, and A. Weiss, "Training the Lambda Router: algorithms and experience," Bell Labs TM 10009626-001214-37, and D. Bishop, P. Gammel, C. R. Giles, "The Little Machines that are Making it Big," Physics Today, vol. 54, no. 10, p. 38, 2001.

Training an N×N (number of input ports/output ports, or I/Os) OXC system includes determining the voltages necessary for aligning $N^2$ mirror-pairs, or in other words, $N^2$ separate switch connections. For example, a 256×256 OXC system requires the training of a total of 65,536 switch connections; and in the case of a 1296×1296 OXC system, a total of 1,679,616 switch connections should be calibrated. Before it can be placed into service, a MEMS-mirror OXC system typically undergoes two separate training processes called "coarse training" and "fine training".

Coarse training produces a rough alignment of the mirror-pairs sufficient enough to transmit a detectable amount of light. This process is best performed using a non-equipment-based method that relies on statistical and physical properties of the OXC system. A description of such a method is provided in a commonly-owned and currently pending patent application by J. V. Gates, W. R. Holland, J. Kim, and S. Pau, entitled "Method for Calibrating a MEMS Device," Ser. No. 10/046,352, identified by attorney docket number Gates-17, and filed Jan. 4, 2001.

Fine training is usually done using a specially configured workstation. The workstation is both optically and electrically connected to an assembled OXC system and finely aligns each mirror-pair for maximum light transmission. This process continues until all $N^2$ possible switch connections are optimized and the corresponding mirror voltages for each switch connection are recorded. The voltages are then written into look-up tables. The OXC then becomes a fully trained and marketable system.

Time-Multiplexed OXC Training System

A time-multiplexed OXC training system uses optical pulses shifted in time by delay devices such as fiber delay coils. These fiber delay coils can be fabricated using single-mode fiber and designed to a particular length such that they create a unique delay, or time-slot, for the optical pulses traveling through them.

Using a training system with optical signal delay devices such as fiber delay coils and time-multiplexing signals using the optical signal delay devices, the state of the art of fine training a MEMS-mirror OXC is advanced. This method enables most of the system to be built out of optical fiber in the form of splitters and delay devices. The system may be designed to use a single light source and a single optical detector.

As noted above, an optical signal is delayed by incorporating a suitable optical signal delay device in the signal path. An example of a delay device is a fiber delay coil of a predetermined length. Optical fiber delay coils are thin especially when routed onto adhesive-faced flexible substrates using technologies such as OptiFlex™ or OptiPath®. Because the fiber delay coils are flexible, they can be shaped to reduce their footprint. Alternatively, the coils can be stacked one on top of another or rolled into tubes. More information on fiber coils can be obtained from W. R. Holland, "Packaging and Manufacturing of Optical Circuits for Signal Processing," talk given at LEOS 2000 Conference, Rio Grand, Puerto Rico, November 2000.

If fiber delay coils are used to delay optical signals that travel through the OXC training system, this could reduce size of the overall system, thereby making it more portable. In some configurations, the OXC training system may be used to achieve parallel switch optimization because all signals can be simultaneously made available for analysis. Such simultaneous signal availability can be used to test certain characteristic properties of the OXC such as (a) the amount of cross talk, if any, that is present between switch connections, (b) loss distribution and (c) time-delay distribution.

In the simplest form, a single laser source is used to create a short optical pulse that is then replicated, or split, into as many pulses as there are inputs into an OXC system, for example, N pulses for N inputs. A sufficient number of delay coils producing the appropriate time delays is then used and arranged so as to ensure that each OXC input receives a unique time-slotted pulse. Additional delay coils can be used on the output side of the OXC to ensure that no matter which switch path the pulses take through the OXC they will maintain a unique time-slot for that path. The N output fibers can then be directed to a single detector for detection of the pulses over a period of time specified by the total number of time-slots. Thus, for each pulse developed at the input to the training system there will be N uniquely time-slotted pulses at the output. The particular time slots that these N pulses reside in at the output will depend on the N switch connections that were made. For this one-time-slot-per-switch-connection scheme up to $N^2$ time-slots are necessary therefore to cover all of the $N^2$ possible switch connections that can be made.

FIG. 1 illustrates the inventive principles of the time-multiplexed OXC training system. On the input side, a MEMS-mirror OXC 100 is coupled to fiber shuffle circuits 130 as well as splitters (not shown) and delay coils 110. On the output side, the OXC 100 is coupled to shuffle circuits 140 and splitters (actually combiners, not shown) and delay coils 112. The splitters at the input end act as time-division multiplexers whereas combiners at the output end act as multiplexers of the signal. Four distinct areas of the circuit, D1 160, D2 170, D3 180 and D4 190 are labeled to enable a more detailed explanation of the invented system.

In FIG. 1 a single optical pulse is split, (alternatively, replicated) into as many pulses as are input ports to the OXC 100 (splitter not shown). These pulses are then fed into multi-fiber ribbons 108 and then into a set of delay coils 110 in the D1 portion 160 of the system. The delay coils 110 in the D1 portion 160 are shown as multiple loops to convey the idea that the coils increase in size in unique increments and thus provide a comparable delay to the optical pulses traveling through them. Shuffle circuits 130 re-direct pulses from each input ribbon 108 into a particular output ribbon 118. Each input ribbon 108 provides a single pulse into each output ribbon 118 in turn so that the pulses are now spread out (delayed) in time and have unique non-overlapping time-slots.

Note that the input optical pulses may be considered to be a part of a set of optical pulses supplied to the input ports of the OXC 100. A key feature of this set of input optical pulses is that each pulse has a unique and non-overlapping timeslot with respect to other pulses in the set.

Larger systems may require multiple sources and detectors to reduce the insertion loss and number of splitters required. Alternative designs may include training systems based on a single "platform" for multiple OXC systems. An example would be to use four separate 256×256 time-multiplexed training systems to create a larger 1024×1024 I/O system where the input and output signals of the separate systems would be multiplexed in their proper orders.

FIG. 1A shows graphs depicting how a single pulse is split or replicated 191, shuffled 192, and time-delayed 193 in various parts of the system. The last plot 194 depicts a possible arrangement of the N time-slotted pulses for a like number of switch connections. As different switch connections are made these will result in another set of N pulses residing in other time slots. During each pulse-cycle of a laser source, a detector would only wait for $N^2$ times one time-slot width to detect all the pulses (i.e., switch connections) made during that particular pulse-cycle. An OXC training system with 2 nsec wide pulses and $N^2$ timeslots may be constructed from these coils but such coils could be long.

Figure 2:
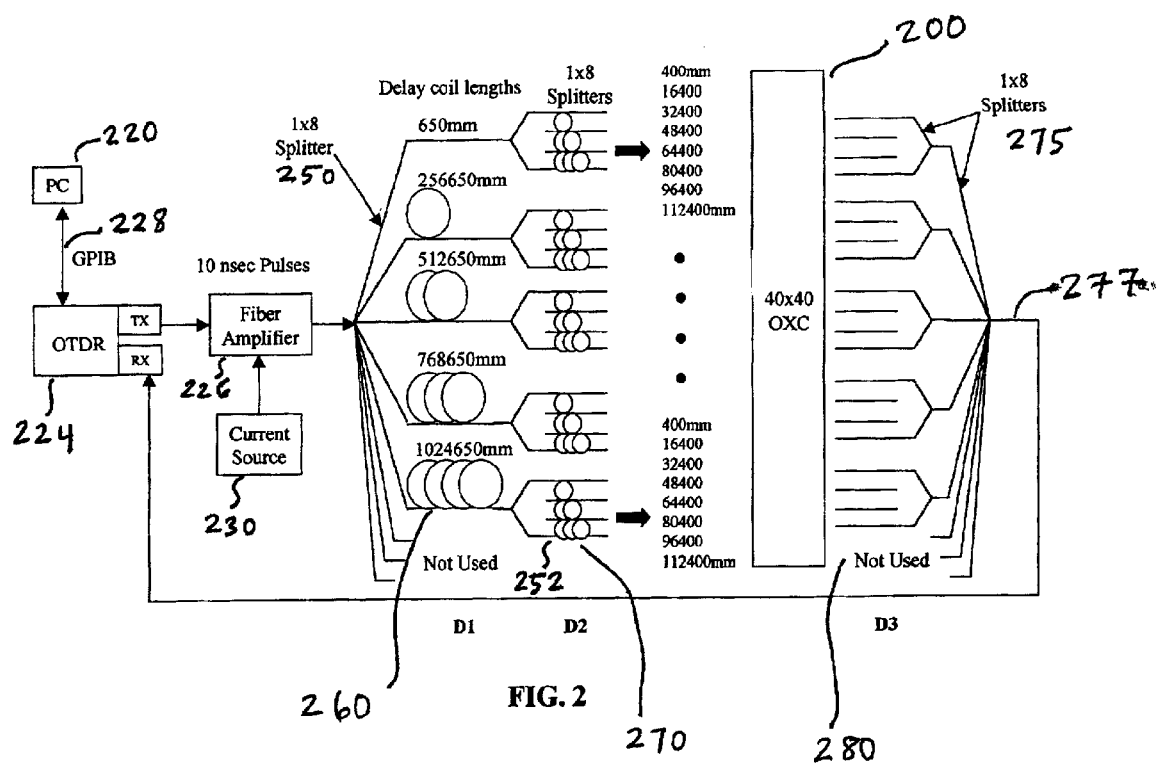
FIG. 2 illustrates a 40×40 time-multiplexed OXC training system.

In the illustrative configuration shown in FIG. 2 a 40×40 I/O MEMS-mirror OXC system 200 is coupled to an optical time-domain reflectometer (OTDR) 224, which contains a pulsed laser source (not shown) and a sensitive photo-detector (not shown). A workstation (or personal computer) 220 to drive the calibration is coupled to the OTDR 224 via a General Purpose Interface Bus (GPIB) 228. A fiber amplifier 226 is connected to the output of the OTDR 224 wavelength transmitter. The fiber amplifier 226 is powered by a current source 230. The fiber amplifier 224 is then connected to the single input-leg of a wavelength division multiplexer (WDM) (not shown), which acts like a wavelength-selective coupler. One of the two output legs of the WDM is in turn connected to a fiber isolator (not shown) on the output. The other output leg of the WDM is connected to a pump laser (not shown), which is powered by a separate current source and a TEC controller (not shown).

FIG. 2 further illustrates a 40×40 time-multiplexed OXC training system constructed according to the principles disclosed. This all-fiber circuit includes a first 1×8 fiber splitter 250 at the input (only 5 of the 8 outputs are needed). Outputs from this splitter 250 then go into a first set of 5 fiber delay coils in the D1 area 260 of the circuit. Outputs from the first set 260 of delay coils (in area D1) in FIG. 2 are then directed into a second set of five 1×8 splitters 252. Outputs from this second set of five splitters 252 then go into a second set of 8 delay coils in the D2 area 270 of the circuit. The outputs from the second set 270 of delay coils (in area D2) are then connected to the 40×40 OXC system 200 using LC connectors. On the output-side of the OXC 200, which is depicted in FIG. 2 as D3 area 280, five 1×8 splitters 275 (actually, five 8×1 combiners, which could have a structure similar to that of a splitter in reverse) with LC connectors (not shown) are used to combine all of the output signals to a single 1×8 splitter (not shown) (only 5 of the 8 inputs are used here as well). A single output from this splitter 277 is then directed to the receiver on the OTDR 224. Note that the process of combining the signals at the output ports is the reverse of the process that occurred at the input ports, i.e., the output signals are effectively multiplexed to form a single combined signal.

In the test configuration, a MEMS-mirror OXC system 200 is connected to a GN-NetTest model TD-3486 OTDR 224. This off-the-shelf OTDR 224 has a 10 nsec wide Full Width at Half Maximum transmission (FWHM) optical pulse development and sensing capability. A more suitable light source/detector combination, for example, a 2 nsec wide optical pulse, may produce better results. Additional improvement may be obtained by using faster data collection electronics. The pump laser can be a Fitel 1480 nm wavelength system. The design shown in FIG. 2 could be expanded, for example, to one containing 256×256 I/Os while still utilizing a single source and detector as will be described later. Software for the workstation 220 shown in FIG. 2 may be developed using LabView CVI instrument driver to position the mirrors in the OXC system as well as control and acquire the fine-training data from the OTDR. Using an SBS 616 PCI-VME controller and VME bus the software may be configured to control a custom-made voltage circuit board and set of high-voltage Digital to Analog Converters (DACs) to position the mirrors. For data acquisition and communication with the OTDR one may utilize a National Instruments PCI GPIB board. Note that the speed of data acquisition can be limited by the OTDR-GPIB communication protocol.

The fiber delay coils in the first set 160 vary in length from 650 mm on up to ~1.03 kilometers in 256 meter increments, or time-delay increments of 1280 ns, and will create 5 separate groups of time-slots. The 1280 ns time spaces are more than adequate for the (8) 80 nsec time-slots (described later) that will occupy these areas.

Figure 3:
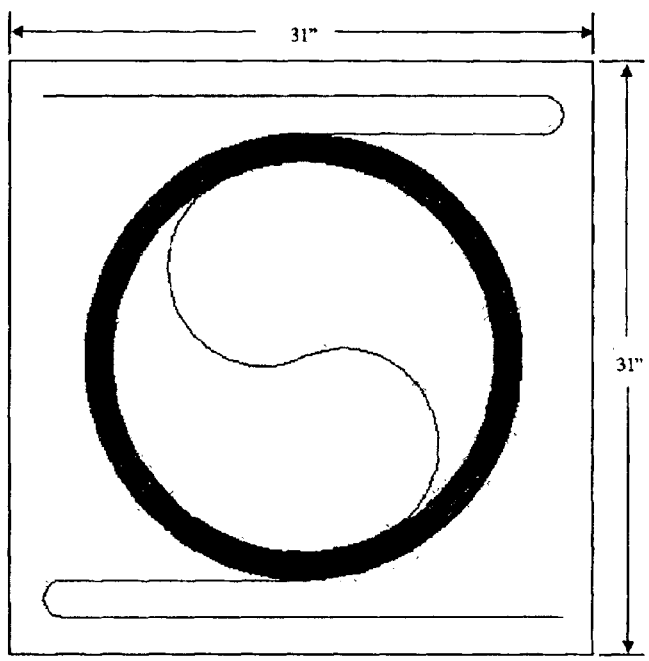
FIG. 3 is a detailed view of a ~257 meter fiber delay coil used in conjunction with the presently described system.

FIG. 3 shows a ~257 meter delay coil which was routed onto a 31" square adhesive-faced Kapton sheet using a PC-controlled OptiFlex™ routing workstation 220 (the 650 mm coil was also routed in a straight line onto this sheet). The 3 longer delay coils for this group were wound onto spools, although it should be possible to route coils as large as 1.5 km in length for this sheet size (OptiFlex™ workstations using larger sheet sizes should be capable of even longer coil lengths).

An 80 nsec time-delay or slot, the fiber should be about 16 meters long. Assuming the refractive index of light in the fiber material is given as η=1.46 for standard single mode fiber, the speed of light in the fiber is given by $c_{fiber}=c_{vacuum}/\eta$. Then the fiber or slot length for an 80 nsec delay would be $1_{fiber}=c_{fiber}\times 80$ nsec≈16 meters. Therefore, the fiber delay coils in the second set 270 may be configured to be in 16 meter increments from 400 mm on up to ~112 meters. This will result in a time-delay of 80 nsec between each slot. These coils can create the 8 relatively close spaced time-slots in the more widely spaced 5 groups of pulses. These coils were routed onto 2 separate 31" square Kapton sheets with 4 coils per sheet.

Figure 4:
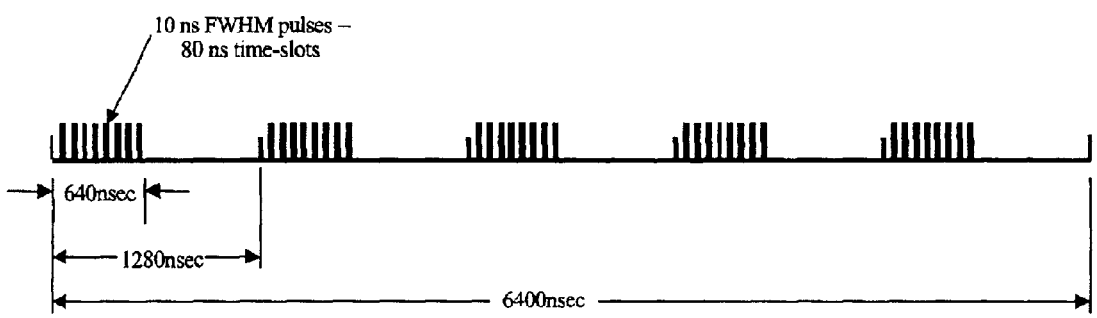
FIG. 4 illustrates time slotted optical pulses for a 40×40 time-multiplexed OXC training system.

FIG. 4 shows pulses and time-slots that would be created by all possible switch connections for this illustrative configuration. Note that there are only 40 time-slots here where each represents 40 separate switch connections.

Advantageously, the fiber amplifier may be fabricated using a length of erbium-doped fiber of about 15 meters of length. The fiber amplifier is capable of producing 26 dB of optical gain at 170 mA of drive current. However, only 70 mA of drive current was used because higher currents produced increased background noise. It is found that a good pulse development and detection is possible with a high extinction ratio, i.e., the amount of optical power produced during a pulse compared to a non-pulse period. This was found to be quite good helping to keep background noise to a minimum. The total insertion loss for the fiber circuit with OXC is less than −55 dB, where the OXC system is assumed to contribute ~10 dB of insertion loss.

In an embodiment, the fiber-to-fiber connections can be made using fusion splicing, for example, 8-fiber ribbons that were mass fusion spliced together. These ribbons may include fibers of the coils in the D2 area and also all of the LC connectors, which can be mass fusion-spliced to the 1×8 splitters in the D2 and D3 areas of the circuit.

In a second design method, an all fiber system can be built using only N time-slots. This second design method uses computer software and coarse-training data to resolve which switch connection out of N possible switch connections was actually made during fine training process. Based on a 10 nsec pulse width system, this second method developed 40, 80 nsec time-slots, each of which represented 40 switch connections rather than the single-pulse per time-slot of the first design. In addition to fine training this second design also has the ability to measure certain characteristic features.

Measuring Cross Talk, Time Delay and Loss Distribution

Figure 5:
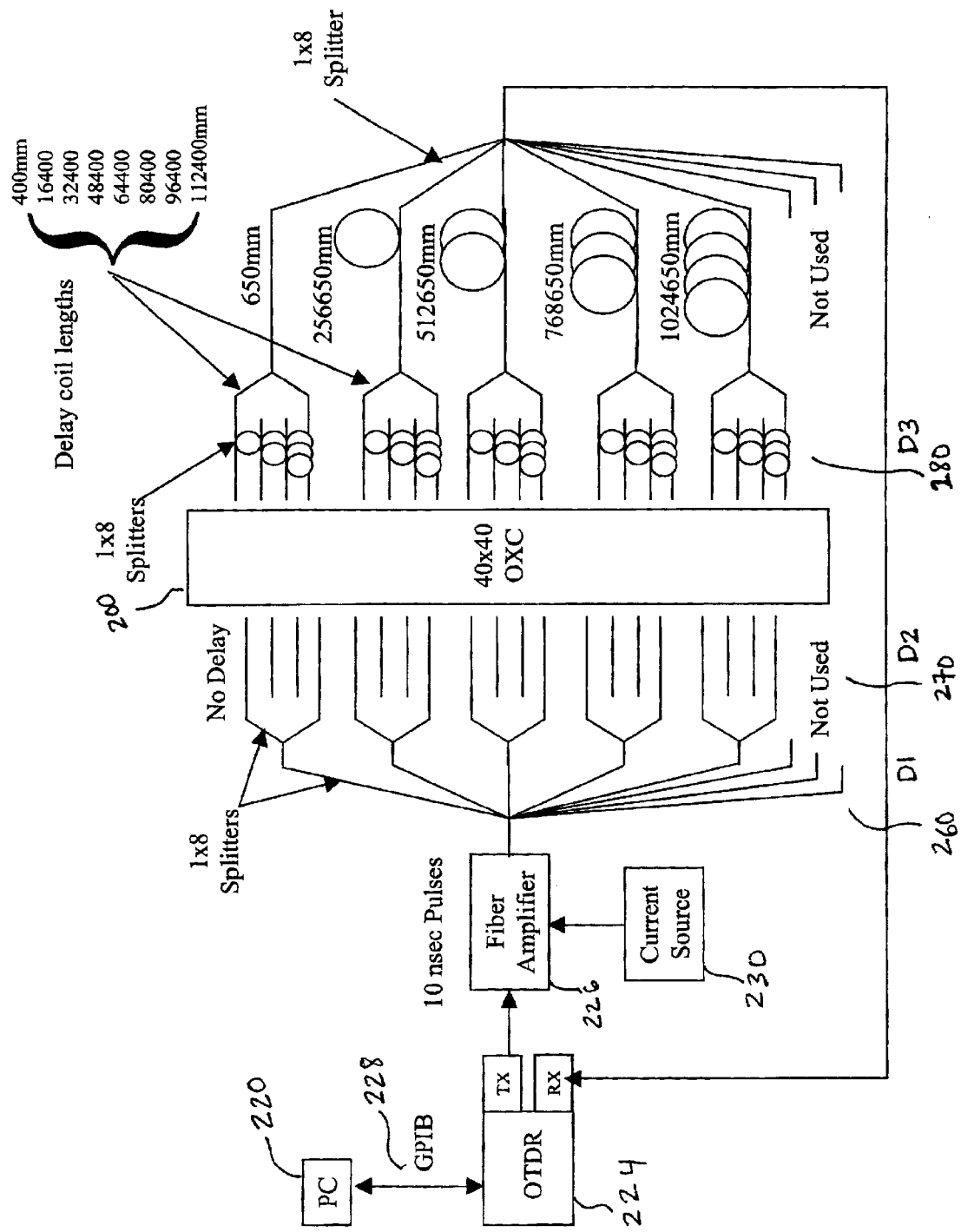
FIG. 5 shows an illustrative circuit configuration to measure certain characteristic features of the OXC.

To demonstrate the ability to measure certain characteristic features of the OXC 200 such as cross talk, the circuit of FIG. 2 can be reconfigured. If pulses from multiple switch connections to reside in the same time-slot, the ability to determine if a signal had leaked, or crossed-over, from one switch path to another could be difficult. Therefore, it would be advantageous to reconfigure the circuit as shown in FIG. 5. Note that in FIG. 5 no delay is applied to the signals at the input end D1 (260) of the OXC 200 but delay coils are present at the output end D3 (280) of the OXC 200. This new configuration would now apply non-time-slotted pulses at the D1 area 260 and allow detection of pulses, which may develop in time-slots where a switch connection was not established, to the OXC system in the D3 area 280.

Assume that an N×N OXC has N input ports and N output ports. By controlling the number of input ports to which a test signal is provided, by providing a known test signal to selected input ports, and by establishing a known number of switched connections, certain characteristic properties of the OXC may be measured. These characteristic properties could be the leakage signal (which is sometimes called cross talk) between channels; time-delay introduced in each channel; and loss distribution within each channel.

Assume that a set of known optical signals is supplied to only a predetermined number of input ports and thereafter the set of input signals is switched within the OXC such that the signal supplied at an input port arrives at an associated output port. Assume further that certain switched connections are not made within the OXC, thereby leaving some output ports with no associated switched signal. If there were signal leakage within the OXC, certain amount of signal may nevertheless be present at the output ports to which no switched signal is provided. If the amount of signal present at these unswitched output ports exceeds a threshold value that accounts for ambient noise and the like, then the excess signal in the unswitched output ports could be a measure of signal leakage.

The foregoing can also be stated as follows. If one applies an optical signal to each of the N input ports, but establishes switched connections within the OXC for only C channels (C<N), thereby connecting C input ports with C output ports, leaving N–C output ports unswitched. If leakage signal is present in the unswitched channels of the OXC, it would appear at the N–C output ports. If the amount of leakage signal present in the N–C output ports exceeds a predetermined threshold value, then that could be a measure of the amount of cross talk in the OXC system. Other characteristic features such as time delay or loss distribution for each OXC channel can be measured in a similar manner.

FIG. 5 shows an illustrative configuration to measure a characteristic feature of the OXC such as the amount of cross talk. In the case depicted in FIG. 5, each of the 40 input ports of the OXC 200 is supplied with an input signal. At each one of the 40 output ports, a signal is subject to a different delay or timeslot. As stated above, an optical signal delay device such as a fiber delay coil of a predetermined length may provide this delay. Suppose the OXC is configured to route signals in the first X channels, for example, the first 39 channels, thereby allowing the switching of 39 input ports to 39 output ports. Suppose further that one output channel is not switched, for example, the 40th output port of the OXC receives no switched optical signal. With this configuration, one can test for cross talk by comparing the strength of any optical signal detected at the 40th output with a threshold signal value that exceeds that of a background signal (e.g., white noise). Note that the threshold signal value could be the amount of signal that would be present due to conditions other than leakage. This threshold value may be predetermined either by experimentation or by computation. The difference provides a measure of cross talk (signal leakage) to the 40th signal connection.

By altering the switch connections and measuring the leakage signal observed at a given output port for each of several configurations, one can determine further which switch path contributed to signal leakage. Additional use may be made of coarse-training data and schematics of the physical layout of the mirrors. Software in the PC 200 may also be used to determine which switch connections were established. Thus, by using a test instrument of appropriate sensitivity, for example, 40 dB, and by establishing one or more switch connections at a time, leakage of signals, i.e., cross talk, may be detected in the other time slots not intentionally connected. Note that if a separate time slot were used for each switch connection, detection of cross talk would not need reconfiguring the circuit as described above.

It is known that an optical signal may travel at different speeds through the several paths in an OXC. Referring further to FIG. 5, because a single optical pulse source is used in the instantly disclosed method, the same method may be used to measure the time delay caused along the various switch connections. For example, a single known input optical pulse may be applied to a set of known input ports. Then a selected number of switch connections may be established. By measuring the output signal obtained at the output ports associated with the switch connections that were established, the time delay caused within the OXC for that switch connection might be measured. If the pulse is short, for example, if the pulse is about 10 nsec, the time delay from each of the connections may be measured from the combined signal at D4 (290). This information may be a useful metric to determine the quality of the OXC. Similarly, by measuring the strength of each of the switch connections at D4 (290), the amount of loss in each path within the OXC may be measured. This would be useful to determine the quality of the various switch connections as well.

Due to the number of splits by the fiber splitters plus the insertion loss of the OXC (which is again assumed to be −10 dB) the total system loss is estimated to be less than −55 dB (a 1×16 fiber splitter has about 14.5 dB max. of insertion loss). Tests conducted on the 40×40 OXC training system using the GN-NetTest OTDR and fiber amplifier have shown that delayed optical pulses attenuated by up to −95 dB can be successfully recovered.

Other Applications

Additional uses of this time-multiplexed OXC training system may be found in calibrating devices such as MEMS optical add/drop multiplexer (OADM), MEMS dynamic gain equalizer (DGEF) and other MEMS, non-MEMS optical subassemblies.

Conclusion

The foregoing describes a method and system for calibrating a MEMS-mirror optical cross connect, enhancing the state of the art. Persons skilled in the art may make several modifications and rearrangements without departing from the spirit and scope of the invention or without undue experimentation. For example, delay devices other than fiber delay coils may be used; a single pulse may be alternatively split or replicated; several identical pulses may be used; and other ways of optical multiplexing and/or demultiplexing may be used. All such modifications and rearrangements should be construed as being within the scope of the appended claims.

What is claimed is:

1. A method of fine training a micro-electromechanical mirror (MEMS) optical cross connect (OXC) system containing a plurality of input ports ($N_i$) and a plurality of output ports ($N_o$), the method comprising the steps of:

creating a set of time-delayed input optical pulses, said set of time-delayed input optical signals having optical signals that occupy a unique, non-overlapping time slot with respect to other pulses in the set;

supplying the set of time-delayed input optical signals to at least some (K) of the plurality of input ports $N_i$ of the OXC, where $K<=N_i$, such that each of the K input ports receives a time-delayed input signal during a unique time slot;

causing the OXC to switch the signals supplied at the K input ports to provide K output signals at the plurality of output ports $N_o$, where $K<=N_o$;

receiving the switched OXC output optical signals at the K output ports;

combining the K output signals to form a combined output signal; and measuring the optical energy in the combined output signal.

2. The method of claim 1 wherein the step of creating a set of time-delayed input optical signals comprises the step of:

splitting and time-delaying an input optical pulse thereby creating the set of time-delayed optical signals each time-delayed optical signal having a unique, non-overlapping timeslot with respect to other pulses in the set.

3. The method of claim 1 wherein the step of creating a set of time-delayed input optical signals comprises the step of:

replicating and time-delaying an input optical pulse thereby creating the set of time-delayed optical signals, each time-delayed optical signal having a unique, non-overlapping timeslot with respect to other pulses in the set.

4. The method of claim 1 wherein the step of creating a set of time-delayed input optical signals comprises the step of:

routing an input optical pulse through one or more sets of fiber delay coils.

5. The method of claim 1 wherein the step of combining the output optical signals comprises the steps of:

optically multiplexing the output optical signals.

6. The method of claim 1, further comprising the step of:

introducing additional delay to one or more output optical signals received at one or more of the plurality of output ports so that the time slot at which a particular pulse appears at a particular output port remains unchanged.

7. The method of claim 6, wherein the step of introducing additional delay includes the step of routing the signal received at the output through additional fiber delay coils.

8. A method of fine training a micro-electromechanical mirror (MEMS) optical cross connect (OXC) system, the method comprising the steps of:

applying a set of time-multiplexed input optical signals, each of the set of input optical signals being configured to occupy a unique, non-overlapping timeslot with respect to other input optical signals in the set;

configuring each OXC input port such that each OXC input port receives a one of the set of time-multiplexed input optical signals;

configuring switch connections within the OXC such that each pulse input to the OXC arrives at a predetermined OXC output port;

combining the optical signals that arrive at each of the output ports to form a combined signal; and measuring the amount of optical energy in the combined signal.

9. The method of claim 8, wherein the set of time-multiplexed input optical signals comprises the step of:

routing the first optical signal through a set of delay devices, each of the set of delay devices being configured to provide the first optical signal with a unique, non-overlapping timeslot with respect to other optical signals in the set.

10. The method of claim 9, wherein the delay device is a fiber delay coil configured to introduce a precise amount of delay.

11. The method of claim 8, further comprising the step of:

before combining the optical signals received at the output ports, routing one or more received optical pulses through a second delay device to create an association between a timeslot for the output pulses and the path taken by the optical signal through the OXC.

12. The method of claim 11, wherein the second delay device is a fiber delay coil configured to introduce a precise amount of delay.

13. A system for fine training a micro-electromechanical mirror (MEMS) optical cross connect (OXC) system containing a plurality of input ports and a plurality of output ports comprising:

a first device coupled to the plurality of input ports of the OXC, said first device configured to provide a set of unique non-overlapping input signals to one or more of the plurality of input ports of the OXC, each of said input signals occupying a different timeslot with respect to other time slots in the set.

14. The system of claim 13, wherein the first device comprises a first set of delay devices adapted to delay an input optical signal such that a predetermined time delay is introduced to the input optical signal.

15. The system of claim 14, wherein the first set of delay devices comprises one or more fiber delay coils.

16. The system of claim 14, further comprising:

a second device coupled to the plurality of output ports of the OXC, said second device configured to combine a plurality of optical signals received at the output ports.

17. The system of claim 16, wherein the second device comprises a second set of delay devices adapted to impart an additional delay to the received optical signal so that the optical signal received at a particular output port is detected at a predetermined time slot.

18. The system of claim 17, wherein the second set of delay devices comprises one or more fiber delay coils.

19. A method of computing a characteristic property related to switch connections in a MEMS-mirror Optical Cross connect (OXC) system, the OXC including a plurality of input ports (N) and a plurality of output ports (N) and a plurality of channels (N) to connect any one of the N input ports with any one of the N output ports, the method comprising the steps of:

applying a set of time-multiplexed input optical signals to one or more of the plurality of N input ports, each of the set of input optical signals being configured to occupy a unique, non-overlapping timeslot with respect to other input optical signals in the set;

establishing switched connections within the OXC for C channels thereby associating C input ports with C output ports, where C<=N, whereby optical signal applied at each of the one or more of the plurality of N input ports arrives at C associated output ports;

measuring optical signal strength at at least one of the C switched output ports;

comparing the optical strength measured at the at least one of the C switched output ports with a threshold value; and computing the value of a characteristic property of the OXC switch.

20. The method of claim 19, where the characteristic property is the amount of leakage signal with respect to at least one of the N–C unconnected output ports.

21. The method of claim 19, where the characteristic property is the amount of time-delay of an optical signal with respect to at least one of the N–C unconnected output ports.

22. The method of claim 19, where the characteristic property is the amount of insertion loss of optical signal with respect to at least one of the N–C unconnected output ports.

23. The method of claim 19, wherein C=1.

24. The method of claim 19, further comprising the steps of:

altering the switch connections in a predetermined fashion; and determining which of the C connections caused signal leakage.

* * * * *